(12) United States Patent
Ramon et al.

(10) Patent No.: US 8,569,920 B2
(45) Date of Patent: Oct. 29, 2013

(54) SMALL ELECTRIC MOTOR

(75) Inventors: David Ramon, Caslano (CH); Hugo Fritschy, Sachseln (CH); Jens Oliver Schulze, Giswil (CH); Hans-Georg Jansing, Sarnen (CH); Raniero Pittini, Hergiswil (CH); Minh Hieu Lam, Rotkreuz (CH); Alexis Boletis, Lucerne (CH)

(73) Assignee: Maxon Motor AG, Sachseln (CH)

( * ) Notice: Subject to any disclaimer, the term of this patent is extended or adjusted under 35 U.S.C. 154(b) by 11 days.

(21) Appl. No.: 13/156,829

(22) Filed: Jun. 9, 2011

(65) Prior Publication Data

US 2011/0304234 A1 Dec. 15, 2011

(30) Foreign Application Priority Data

Jun. 15, 2010 (DE) .......................... 10 2010 023 813

(51) Int. Cl.
*H02K 21/12* (2006.01)

(52) U.S. Cl.
USPC ............. 310/156.08; 310/156.11; 310/156.21

(58) Field of Classification Search
USPC ............. 310/156.08, 156.09, 156.11, 156.21
See application file for complete search history.

(56) References Cited

U.S. PATENT DOCUMENTS

| | | | |
|---|---|---|---|
| 4,667,123 A | 5/1987 | Denk et al. | |
| 4,741,094 A | 5/1988 | Denk et al. | |
| 4,942,322 A | 7/1990 | Raybould et al. | |
| 5,723,933 A * | 3/1998 | Grundl et al. | 310/266 |
| 5,936,324 A * | 8/1999 | Montagu | 310/156.11 |
| 6,331,214 B1 | 12/2001 | Koga et al. | |
| 6,841,912 B2 * | 1/2005 | Yamada et al. | 310/156.28 |
| 2003/0168925 A1 | 9/2003 | Bernreuther et al. | |

FOREIGN PATENT DOCUMENTS

| | | |
|---|---|---|
| CH | 693 014 A5 | 1/2003 |
| DE | 36 86 863 T2 | 6/1993 |
| DE | 101 52 151 A1 | 5/2003 |
| DE | 10 2005 052 870 A1 | 5/2007 |
| GB | 2 396 751 A | 6/2004 |
| JP | 11-289700 A | 10/1999 |

OTHER PUBLICATIONS

German Search Report dated Nov. 17, 2010.

* cited by examiner

*Primary Examiner* — Dang Le
(74) *Attorney, Agent, or Firm* — Buchanan Ingersoll & Rooney PC

(57) ABSTRACT

In a small electric motor having a stator and a rotor which includes a solid-cylindrical permanent magnet and at least one shaft element mounted on a face of the permanent magnet and bonded thereto by adhesive, the shaft element has at least one recess on its face facing the permanent magnet. The adhesive is introduced into the recess and contacting the face of the permanent magnet in the area of the recess.

20 Claims, 2 Drawing Sheets

SMALL ELECTRIC MOTOR

The present invention relates to a small electric motor. Small electric motors, also called micro motors, are known from the prior art; these have a rotor substantially comprising a solid-cylindrical permanent magnet which is diametrically magnetized as a rule. The solid-cylindrical permanent magnet of the rotor is here surrounded by a stator comprising a plurality of windings most of the time. To enhance the efficiency of such micro motors, both for constructional and manufacturing reasons, a continuous shaft that would require a central continuous bore of the permanent magnet is often omitted. It is known that, instead of this, so-called shaft ends, also called shaft elements hereinafter, are mounted on the two faces of the solid-cylindrical permanent magnet. The shaft ends thereby mostly form the bearing seat of the rotor.

DE3686863T2 discloses a rotor having a solid-cylindrical permanent magnet to the faces of which two shaft elements, designated as end pieces, are adhesively bonded. The bonding operation is carried out with the help of a contact adhesive according to the description.

Moreover, a rotor for an electric micro motor is also known from CH6930145A5. In this publication the planar faces of the two shaft ends that face the solid-cylindrical permanent magnet are inseparably connected to the respectively opposite and also planar faces of the permanent magnet. The connection is established by gluing or by welding by means of laser. It is also described that the faces of the permanent magnet may comprise central recesses into which correspondingly complementary tips of the shaft ends may extend to center the components relative to one another.

A similar rotor for a micro motor is also known from JP11-289700.

Due to the small dimensions of electric micro motors a high dimensional accuracy, accomplished by way of small manufacturing and mounting tolerances, constitutes a general requirement in the manufacture of such electric motors. Moreover, small tolerances are always an important issue for accomplishing the optimum of many constructional targets, such as e.g. for achieving higher efficiency, because with small manufacturing and mounting tolerances it is e.g. possible to keep the air gap between rotor and stator small. In the small electric motors of the aforementioned type as known from the prior art, the problem arises that a precise alignment and centering of the shaft elements relative to the solid-cylindrical permanent magnet cannot be realized to the desired extent all the time. For instance, if the shaft ends are welded to the permanent magnet, the components concerned may distort due to the temperatures evolving during welding. If the shaft ends are adhesively bonded to the permanent magnet, the adhesive layer between a face of a shaft element and an opposite face of the solid-cylindrical permanent magnet is the reason why problems in terms of dimensional accuracy are difficult to handle. This is once true for the thickness of the adhesive layer that has an impact on the total length of the subassembly consisting of permanent magnet and shaft ends. In addition, due to the adhesive layer the shaft ends may slightly tilt in relation to the permanent magnet, whereby the axes of the two shaft ends will no longer extend in a coaxial configuration, but will have a small angle relative to each other. This results in unbalances and may lead to damaged bearings. The said inaccuracies that are due to the joining methods known from the prior art and carried out by way of bonding or welding can be minimized in technical processes, but this requires great efforts during manufacture, particularly during assembly.

It is therefore the object of the present invention to provide a small electric motor of the aforementioned type that allows a very precise alignment of the shaft elements relative to the permanent magnet in a simple way during manufacture and that is at the same time economic in terms of construction and manufacture. Moreover, excellent mechanical strength and stress stability of the connection are to be achieved. This object is achieved by the features of the independent claim 1. Hence, in a small electric motor comprising a stator and a rotor, in which a shaft element is adhesively bonded to a face of the permanent magnet, the object is achieved according to the invention when the shaft element comprises at least one recess on its face facing the permanent magnet, the adhesive being introduced into the recess for adhesively bonding shaft element and permanent magnet and the adhesive contacting the face of the permanent magnet in the area of the recess. With the solution according to the invention it is possible that the tolerance-defining areas of the face of the shaft element directly abut on the opposite face of the permanent magnet, so that extremely small dimensional tolerances can be adhered to on the one hand with respect to the axial length of the rotor subassembly and a possible tilt of the shaft element axis relative to the axis of the solid-cylindrical permanent magnet is on the other hand just defined through the shape and position tolerances of the adjoining faces of the two components and is not additionally subject to a tolerance difficult to control by reason of an interposed adhesive layer. The adjoining faces of shaft element and permanent magnet are preferably made planar and oriented in a direction perpendicular to the rotor axis. According to the solution of the invention, the recesses for receiving the adhesive are provided at the shaft element side, whereby an additional treatment of the face of the solid-cylindrical permanent magnet is not needed. This has the advantage that interference with the magnetic flux of the preferably diametrically magnetized permanent magnets, as would be caused—though to a minor degree—by a recess introduced into the face of the permanent magnet, is avoided. Moreover, a machining treatment of the face of the permanent magnet for producing the recesses would be much more difficult as a rule, depending on the material of the permanent magnet, than the treatment of the face of the opposite shaft element. The shaft element may consist of both a magnetizable and a non-magnetizable material.

Further advantageous configurations of the present invention are the subject of the sub-claims.

In a preferred embodiment of the present invention, at least a part of the face of the shaft element directly abuts on the face of the permanent magnet. The greatest advantage provided by the above-illustrated inventive idea is thereby fully exploited. Dimensional accuracy and positional inaccuracies are just influenced via the dimensional tolerances of the components and the shape and position tolerances of the adjoining faces, respectively, and are not additionally subject to any tolerance due to the adhesive gap between the face of the shaft element and the face of the permanent magnet. The adhesive bond of the two components just exists in the area of the recess introduced into the face of the shaft element. While this type of bonding is particularly preferred, it has been found that in the case of excessive adhesive a small amount of adhesive exits out of the recess, thereby creating a small, but not continuous adhesive gap between the faces of the two components. Nevertheless, the achievable dimensional accuracy is in this case also far better than in the rotors known from the prior art. Preferably, a respective shaft element is provided on each of the two faces of the permanent magnet. The shaft elements themselves may either comprise a part of a shaft, or recesses or fastening means may be provided on the shaft elements for mounting a shaft part. It is thereby made possible that the rotor shaft extends at both sides of the permanent magnet.

The establishment of the connection between shaft element and permanent magnet turns out to be very simple in terms of assembly if the recess is given a circular annular configuration and is designed to be coaxial to the rotational axis of the rotor. The alignment of the shaft element in relation to the permanent magnet is here extremely precise if the recess is formed in the radially outer area of the shaft element. As a result the near-axis portions of the planar faces of shaft element and permanent magnet come to rest on one another. In these near-axis portions of the planar faces of the two components the dimensional tolerances as well as shape and position tolerances due to the manufacturing process can be best adhered to according to experience. As a result, the length of the rotor subassembly consisting of permanent magnet and shaft element is subject to a very small overall tolerance, and a possible tilt of the shaft element axis relative to the axis of the permanent magnet is thereby also further minimized. Particularly preferably, the recess extends in radial extension up to the outer circumference of the permanent magnet. As an alternative, the recess is spaced apart in radial direction from the outer circumference of the permanent magnet.

In a further preferred embodiment of the present invention, at least in a portion axially adjoining the face of the permanent magnet the shaft element has the same outer diameter as the permanent magnet itself. This facilitates, on the one hand, the positioning of the components during assembly; on the other hand, this construction permits a smooth and stable transition between the two components. Preferably, the diameter of the shaft element is not greater than the diameter of the permanent magnet, whereby a compact construction is achieved in radial direction. If the diameter of the shaft element corresponds to the diameter of the permanent magnet and if the circular annular recess extends in radial extension up to the outer circumference of the permanent magnet and of the shaft element, respectively, the recess is thereby accessible from the outside, whereby the adhesive for mounting the rotor subassembly can already be introduced into the recess from the outside after the two components have already been aligned relative to each other.

Excellent strengths of the adhesive bond between shaft element and permanent magnet can be achieved if the depth of the recess is not more than 1 millimeter.

In a further and particularly preferred embodiment the shaft element comprises a sleeve-like projection. The projection encloses the permanent magnet in form-fit fashion in a portion axially adjoining the face of the shaft element. The two components are thereby centered automatically relative to each other. A particularly stable connection between shaft element and permanent magnet can be achieved if there is a press fit between permanent magnet and sleeve-like projection. The press fit can e.g. be produced thermally when the permanent magnet is cooled prior to assembly and the shaft element is heated at the same time. In comparison with a purely mechanically produced press fit a thermally produced press fit offers the advantage that due to much greater material stresses a much more stable connection can be established. Since the edge between the face of the permanent magnet and the outer circumference thereof is often rounded off, the axial length of the sleeve-like projection must be so great that it goes beyond the rounding of the edge. It is only in this way that a precise centering of the two components relative to each other is achievable.

In a further preferred embodiment the permanent magnet is encapsulated and enclosed by a sleeve-like capsule for this purpose. Since due to the manufacturing process the sleeve-like capsule must be open at least at one side, the shaft element can form a closure of the capsule on the face of the permanent magnet. The sleeve-like capsule may be both closed at one side and opened at both ends, and in the last case it is possible to close the capsule at both ends by a respective shaft element.

In a further preferred embodiment of the present invention the shaft element forms a bearing seat of the rotor. As an alternative, the shaft element may comprise a bore into which a shaft stub is pressed, the shaft stub forming a bearing seat of the rotor. This results in more flexibility in fabrication or production for the reason that the shaft element can be equipped with different shaft stubs in conformity with the respective requirements. Depending on the type of small electric motor, the shaft stubs may e.g. have different lengths and different diameters and shapes.

In a further preferred embodiment the permanent magnet is composed of a plurality of sub-magnets. An extremely strong permanent magnet can thereby be produced. In a further preferred embodiment the permanent magnet comprises a bore or a cavity, whereby possibly additional components can be integrated e.g. for the sensor system into the rotor subassembly.

Preferably, the stator is configured with an iron-free cylindrical winding. A low performance weight and high efficiency can thereby be achieved.

Preferred embodiments of the present invention shall now be explained in more detail with reference to drawings, in which.

As for the following observations, like members are designated by like reference numerals.

Figure 1:
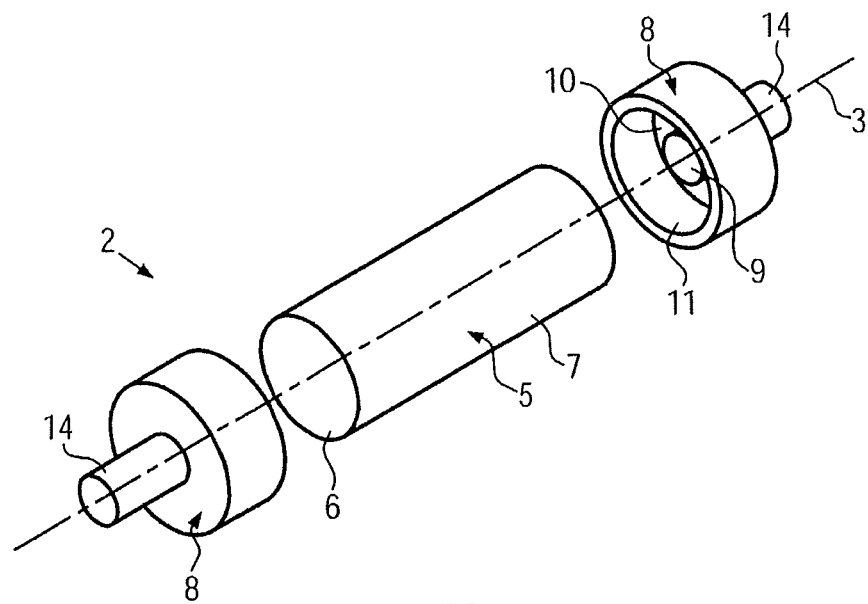
FIG. 1 is an exploded oblique view of the rotor of a small electric motor according to the invention, consisting of a solid-cylindrical permanent magnet and two shaft elements.
Figure 2:
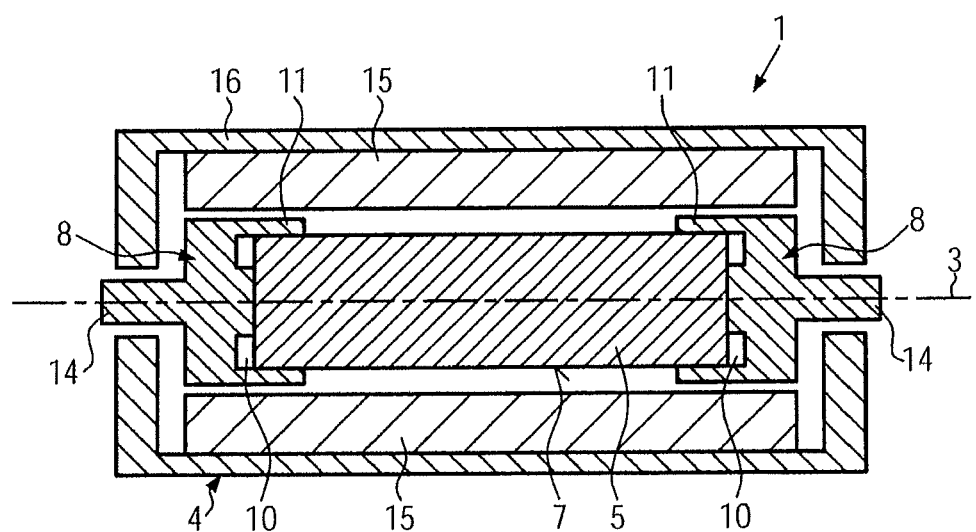
FIG. 2 shows the rotor of FIG. 1 in the finish-mounted state, inserted into a small electric motor according to the invention (longitudinal section)

FIGS. 1 and 2 show a first embodiment of the rotor of a small electric motor according to the invention. FIG. 1 shows the rotor according to the invention in an exploded oblique view. FIG. 2 shows the rotor in a longitudinal section, installed in a permanent magnet-excited small electric motor according to the invention. The rotor 2 consists of a solid-cylindrical permanent magnet 5 and a respective shaft element 8 on one of the two ends of the solid-cylindrical permanent magnet 5. The rotational axis 3 of the rotor subassembly and of the rotor 2, respectively, is congruent with the geometrical axes of permanent magnet 5 and shaft elements 8. Each of the two shaft elements 8 abuts with its planar face 9 on a respective face 6 of the permanent magnet. The faces of both the shaft elements 8 and the permanent magnet 5 are here oriented in a direction perpendicular to the rotor axis 3. A circular annular recess or groove 10 is formed in the face 9 of the shaft elements 8. The shaft elements 8 are adhesively bonded to the permanent magnet 5, the adhesive being just introduced into the recesses 10, so that the shaft elements 8 with the remaining face 9 directly adjoin a respective one of the two faces 6 of the permanent magnet. In a portion adjoining the permanent magnet, the rotation-symmetrical shaft elements 8 have a diameter which is slightly greater than the diameter of the permanent magnet itself. Furthermore, the shaft elements 8, starting from the face 9 thereof, comprise a sleeve-like projection 11 which encloses the outer circumference 7 of the permanent magnet in form-fit fashion. A preferably thermally produced press fit exits between the sleeve-like projection 11 and the permanent magnet 5. In the case of the illustrated rotor 2 the annular recesses 10 extend in their radial extension up to the outer circumference 7 of the permanent magnet. It is possible by way of a bore (not shown) formed in the shaft elements 8, which may extend either axially or radially and communicates with the recess 10, to fill in the adhesive for bonding the shaft elements to the permanent magnet after the components have been aligned or after the thermally produced press fit has been formed. If such a bore is omitted, the adhesive must be introduced into the recess 10 before the components are assembled. Each shaft element 8 comprises a shaft stub 14 which extends in axial direction diverting from the permanent magnet 5 and has a much smaller diameter than the permanent magnet 5 and the maximum diameter of the shaft elements 8 or the sleeve-like projections 11 thereof. As shown in FIG. 2, the two shaft stubs 14 form a bearing seat and are supported in the housing 16 of the small electric motor 1. Together with the plurality of iron-free cylindrical windings 15 arranged on the circumference of the rotor, the housing 16 forms the stator 4 of the small electric motor 1.

Figure 3:
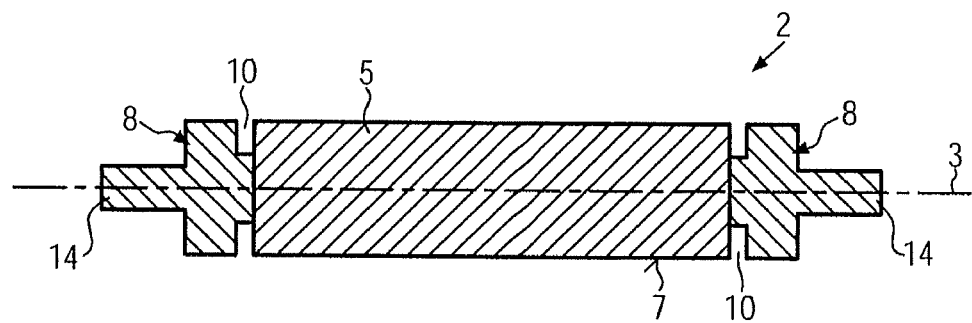
FIG. 3 shows an alternative embodiment of a rotor according to the invention in longitudinal section.

FIG. 3 shows a modification of the rotor according to the invention as shown in FIGS. 1 and 2, which modification can be achieved in a particularly simple way. In contrast to the rotor 2 as shown in FIGS. 1 and 2, the shaft elements 8 are without any sleeve-like projection 11 and have a maximum diameter corresponding to the diameter of the permanent magnet 5. As a result, the recesses 10 of the shaft elements 8 are freely accessible. For mounting the rotor subassembly 2 consisting of permanent magnet 5 and shaft elements 8, the components can be assembled and aligned in a simple way, whereupon the adhesive is introduced from the outside into the recesses 10.

Figure 4:
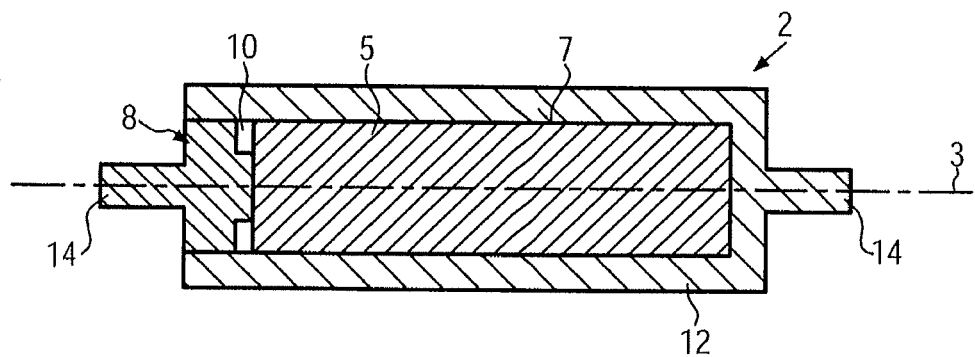
FIG. 4 shows a further alternative embodiment of a rotor according to the invention with a sleeve-like capsule closed at one side, also in longitudinal section.

FIG. 4 shows an alternative preferred embodiment of a rotor 2 according to the invention. The permanent magnet 5 is here encapsulated in form-fit fashion by a sleeve-like capsule 12 which is unilaterally closed at the right side. The left shaft element 8 conforms to the shaft elements of FIG. 3 and forms the closure of the sleeve-like capsule 12. Just like the shaft element 8, the sleeve-like capsule 12 also comprises a shaft stub 14 at the right side, the shaft stub 14 serving as a bearing seat of the rotor 2. The left shaft element 8 is also enclosed by the sleeve-like capsule 12, and a press fit may exist between capsule 12 and permanent magnet 5 and also between capsule 12 and shaft element 8. If the permanent magnet 5 is composed of a plurality of sub-magnets, the encapsulation ensures a very stable rotor subassembly.

Figure 5:
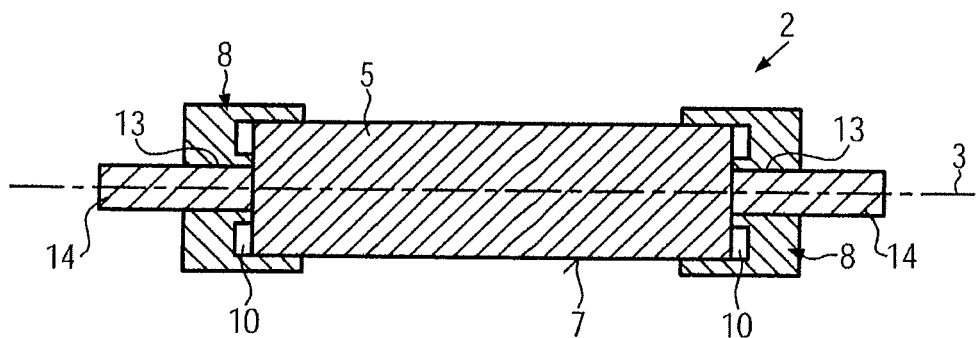
FIG. 5 shows a modification of the rotor according to the invention as shown in FIGS. 1 and 2, also in longitudinal section.

Finally, FIG. 5 shows a further slight modification of the rotor 2 as shown in FIGS. 1 and 2, the modification permitting more flexibility in the manufacture of the small electric motor. In contrast to the shaft elements 8 as shown in FIGS. 1 and 2, the shaft stubs 14 in this variant are not made integral with the shaft elements 8, but are each pressed into a bore 13 of the shaft elements 8. Depending on the requirements, it is thereby possible to use different shaft stubs 14 so as to adapt the bearing seat and the length of the shaft stubs in an appropriate way in conformity with the corresponding applications. It goes without saying that the axial bores 13 in the shaft elements 8 must extend in a direction coaxial to the axis of the permanent magnet and coaxial to the rotational axis 3 of the rotor 2, respectively.

The invention claimed is:

1. A small electric motor comprising:
   a stator; and
   a rotor, the rotor including a solid-cylindrical permanent magnet and at least one shaft element mounted on a face of the permanent magnet and bonded thereto by adhesive, wherein the shaft element includes at least one recess on its face facing the permanent magnet, wherein at least a portion of the face of the shaft element contacts the face of the permanent magnet, and a bottom of the recess is spaced apart from the face of the permanent magnet, wherein the adhesive is located in the recess and the adhesive located in the recess directly contacts the face of the permanent magnet.

2. The small electric motor according to claim 1, wherein a respective shaft element is provided on each of two faces of the permanent magnet.

3. The small electric motor according to claim 1, wherein the recess is given a circular annular configuration and is designed to be coaxial to a rotational axis of the rotor.

4. The small electric motor according to claim 1, wherein the recess is formed in a radially outer area of the shaft element.

5. The small electric motor according to claim 1, wherein the recess extends in a radial extension up to an outer circumference of the permanent magnet.

6. The small electric motor according to claim 1, wherein the recess is spaced apart in a radial direction from an outer circumference of the permanent magnet.

7. The small electric motor according to claim 1, wherein at least a portion of the shaft element axially adjoining the face of the permanent magnet has the same outer diameter as the permanent magnet.

8. The small electric motor according to claim 1, wherein a depth of the recess is not more than 1 millimeter.

9. The small electric motor according to claim 1, wherein the shaft element comprises:
   a sleeve-like projection which encloses the permanent magnet in form-fit fashion in a portion axially adjoining the face of the shaft element.

10. The small electric motor according to claim 9, wherein a press fit exists between the permanent magnet and sleeve-like projection.

11. The small electric motor according to claim 1, wherein the permanent magnet is enclosed by a sleeve-like capsule, with the shaft element closing the capsule on the face of the permanent magnet.

12. The small electric motor according to claim 1, wherein the shaft element forms a bearing seat of the rotor.

13. The small electric motor according to claim 1, wherein the shaft element comprises:
   a bore into which a shaft stub is pressed, with the shaft stub forming a bearing seat of the rotor.

14. The small electric motor according to claim 1, wherein the stator is configured with an iron-free cylindrical winding.

15. A small electric motor comprising:
   a stator; and
   a rotor, the rotor including a solid-cylindrical permanent magnet and at least one shaft element mounted on a face of the permanent magnet and bonded thereto by adhesive, wherein the shaft element includes at least one recess on its face facing the permanent magnet, the adhesive being introduced into the recess and directly contacting the face of the permanent magnet in an area of the recess,
   wherein the recess on the face of the shaft element is an annular groove, a portion of the face of the shaft surrounded by the recess contacting the face of the permanent magnet and a second portion of the face defined by the recess being spaced apart from the face of the permanent magnet.

16. The small electric motor according to claim 15, wherein a respective shaft element is provided on each of two faces of the permanent magnet.

17. The small electric motor according to claim 15, wherein at least part of the face of the shaft element directly abuts on the face of the permanent magnet.

18. The small electric motor according to claim 15, wherein the recess is given a circular annular configuration and is designed to be coaxial to a rotational axis of the rotor.

19. The small electric motor according to claim 15, wherein the recess is formed in a radially outer area of the shaft element.

20. The small electric motor according to claim 15, wherein the recess extends in a radial extension up to an outer circumference of the permanent magnet.

* * * * *